(12) United States Patent
Portuallo et al.

(10) Patent No.: US 11,661,009 B2
(45) Date of Patent: *May 30, 2023

(54) MIRROR DISPLAY ASSEMBLAGE

(71) Applicant: Arta Holdings LLC, Coral Springs, FL (US)

(72) Inventors: Thomas Portuallo, Parkland, FL (US); Ariel Gonzalez, Miami, FL (US)

(73) Assignee: Arta Holdings LLC, Coral Springs, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/644,329

(22) Filed: Dec. 14, 2021

(65) Prior Publication Data

US 2022/0105868 A1 Apr. 7, 2022

Related U.S. Application Data

(63) Continuation of application No. 16/687,322, filed on Nov. 18, 2019, now Pat. No. 11,203,298, which is a continuation-in-part of application No. 16/010,423, filed on Jun. 16, 2018, now Pat. No. 10,717,393.

(51) Int. Cl.
*B60R 1/12* (2006.01)
*B60R 1/06* (2006.01)

(52) U.S. Cl.
CPC . *B60R 1/12* (2013.01); *B60R 1/06* (2013.01)

(58) Field of Classification Search
CPC ... B60R 11/00; B60R 13/04; B60R 2011/004; B60R 1/12; B60R 13/005; B60Q 1/2615; B60Q 1/2696; B60Q 1/32; F16B 5/12; F16B 2/065; B25B 5/067; B25B 5/101; G09F 21/04; G09F 21/048

See application file for complete search history.

(56) References Cited

U.S. PATENT DOCUMENTS

| | | | | |
|---|---|---|---|---|
| 2,245,755 A | * | 6/1941 | Carpenter | F21S 41/28 340/815.73 |
| 5,074,508 A | * | 12/1991 | Powers | B60R 7/10 224/570 |
| 5,611,510 A | * | 3/1997 | Yamamoto | B60Q 1/0483 248/467 |
| 6,467,918 B2 | * | 10/2002 | Strode | B60R 1/12 359/872 |

(Continued)

*Primary Examiner* — Christopher Garft
(74) *Attorney, Agent, or Firm* — Nolan IP Law; Jason M. Nolan (57) ABSTRACT

A vehicle side-view mirror display assemblage including a display body and a display member is provided. The body includes upper and lower portions. The upper portion has an elongate structure with an upward facing surface and a downward facing surface, the upward facing surface being configured for mounting to an object. The lower portion protrudes outward from the downward facing surface of the upper portion, and includes a first face, a second face, and a cavity having an open end on the first face and a closed end defined by a cylindrical threaded cavity body protruding from the second face about the lateral axis. The display member includes a reciprocal threaded member on a first end configured to be inserted into the open end of the cavity on the first face and rotatably secured to the threaded cavity body, and a second end having a surface configured to display indicia.

13 Claims, 13 Drawing Sheets

(56) References Cited

U.S. PATENT DOCUMENTS

| | | | | |
|---|---|---|---|---|
| 6,530,548 B2* | 3/2003 | Pizzirusso | ............ | A47G 29/083 |
| | | | | 248/339 |
| 6,811,269 B2* | 11/2004 | Strode | ....................... | B60R 1/12 |
| | | | | 359/872 |
| 2009/0136905 A1* | 5/2009 | Burnstein | .............. | G02C 11/02 |
| | | | | 434/128 |
| 2013/0189456 A1* | 7/2013 | Verbeyst-Hayes | .... | B60R 13/005 |
| | | | | 428/31 |

* cited by examiner

MIRROR DISPLAY ASSEMBLAGE

CROSS-REFERENCE TO RELATED APPLICATIONS

This application is a continuation of U.S. patent application Ser. No. 16/687,322, filed on Nov. 18, 2019, which is a continuation-in-part of U.S. patent application Ser. No. 16/010,423, filed on Jun. 16, 2018, now U.S. Pat. No. 10,717,393; the contents of which are relied upon and incorporated herein by reference in their entirety, and the benefit of priority under 35 U.S.C. § 120 is hereby claimed.

FIELD

The present disclosure relates to a display assemblage, and more particularly to a vehicle display assemblage mountable about a side view mirror of a vehicle.

BACKGROUND

For many years, vehicle personalization has continued to steadily increase. Exterior novelty vehicle accessories, such as vehicle flag systems that mount to the upper edge of a vehicle window are common. The novelty vehicle accessories used to express individuality of one's vehicle is no more pronounced than vehicle flags. From American and military flags to one's favorite sports team, many options exist to personalize existing vehicles on the road by hanging a flag out of a window.

However, a number of shortcomings exist for existing novelty vehicle accessories, particularly including vehicle window flags. For example, one major shortcoming to existing vehicle flags is that when a person accidentally rolls down the window, the flag is commonly ripped from the window due to wind. Thus, the novelty vehicle accessory of a window flag provides personalization but in turn prevents full function of the vehicle.

In another shortcoming, vehicle window flags are limited to displaying only from a vehicle window. For example, U.S. Pat. No. 5,463,974 discloses that prior flag mounts work effectively when stationary but tend to fall off while the vehicle is in transit due to the torsional and bending movements generated by wind forces.

There is a need in the art for a vehicle display assemblage capable of securing about the side view mirrors of a vehicle.

SUMMARY

The present disclosure advantageously provides a novelty side view mirror display assembly comprising a clamping bracket that has a base portion, a first clamp surface that extends from an upper edge of the base portion, the first clamp surface formed for contacting an outer rearview mirror surface, the clamping bracket further including at least one display aperture, a clamp member having a central body, a second clamp surface extending substantially perpendicular out from the central body along a first central body edge, and a bottom portion extending substantially perpendicular out from the central body along a second central body edge, the bottom portion includes at least one tension member configured for drawing the second clamp surface towards the first clamp surface and at least one indicia members securable about the at least one display aperture.

According to an embodiment of the present disclosure, a principal object is to further provide at least two display apertures and at least two indicia members secured with the at least two display apertures.

According to an embodiment of the present disclosure, another object is to provide one or more indicia members that secure and release with one or more display apertures.

According to yet another embodiment of the present disclosure, another object is to provide a novelty side view mirror display assembly that is constructed and arranged to clamp against the edge of a side view mirror of a vehicle.

According to another embodiment of the present disclosure, another object is to provide a novelty side view mirror where at least one indicia member is a jewel.

According to yet another embodiment of the present disclosure, another object is to provide a novelty side view mirror display assembly where at least one indicia member includes an LED that illuminates during vehicle motion.

According to an embodiment of the present disclosure, another object is to provide a novelty side view mirror display assembly where the first clamp surface and the second clamp surface are affixed with a scratch layer provided for contacting the side view mirror thereby preventing the first and second clamp surfaces from scratching paint when in contact with the side view mirror.

Yet another object is to provide a novelty side view mirror display assembly where the at least one tension members are screws.

According to an embodiment of the present disclosure, another object is to provide a novelty side view mirror display assembly in which rotating the tension members clockwise causes the distal tip to push against a rear surface of the base portion thereby drawing the second clamp surface towards the first clamp surface.

According to an embodiment of the present disclosure, another object is to provide a display body formed of a one-piece injection molding constructed and arranged to secure via double-sided tape against at least a portion of a side-view mirror of a motor vehicle for displaying indicia and wherein the display body constructed and arranged to receive display members. The novelty side-view mirror display assembly of the display members are capable of personalized customization, including without limitation stickers of sports teams, flowers, family/friend pictures or any other conceivable personalized indicia. The novelty side-view mirror display assembly is secured via a mount body portion of the display body about a bottom surface of the side-view mirror of the motor vehicle. A non-limiting conical truncated display member is secured with the display body, the conical truncated display member includes a surface for coupling a display indicia for customization. Alternative to the conical truncated display member can be other personalized display members, including without limitation a jewel display member that secures via a threaded portion with a cavity of the display body.

According to an embodiment of the present disclosure, another object is to provide a display body formed of a one-piece injection molding, the display body includes a front-body portion and a back-body portion, the display body includes a mount body that extends along a mount body edge of the display body between a first top edge and a second top edge, the display body includes a first side edge and a second side edge, the first side edge and the second side edge merging along a rounded bottom edge, the first side edge and second side edge each continue along a first and second flange edge terminating at a first top edge and a second top edge, the mount body formed extending substantially perpendicular with the display body, the front-body portion having a cavity for receiving a display member, the cavity has threading for receiving a reciprocating threaded member of the display member, the display body having a cavity body protruding out from said back-body portion, the cavity body housing at least a portion of the cavity with said threading, the mount body having an upward facing surface securable via double-sided tape a portion of a side-view mirror of a motor vehicle, and at least one display member securable with the cavity. The display member includes an indicia surface capable of receiving indicia for customized personalization display. The display member is optionally mounted with a side-view mirror of a motor vehicle such that the front-body portion optionally pointing forward, pointing rearward, or out from the side of the motor vehicle using the side-view mirror and/or motor vehicle as a reference point. The display member in a non-limiting embodiment may include an LED that illuminates during vehicle motion.

Other objects will become evident as the present disclosure is described in detail below.

BRIEF DESCRIPTION OF THE DRAWINGS

Embodiments of the present application are described herein in which similar elements are given similar reference characters, and a more complete understanding of the present disclosure, and the attendant advantages and features thereof, will be more readily understood by reference to the following detailed description when considered in conjunction with the accompanying drawings wherein.

DETAILED DESCRIPTION

The present disclosure advantageously provides a vehicle display assemblage. Accordingly, the vehicle display assemblage components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Figure 1:
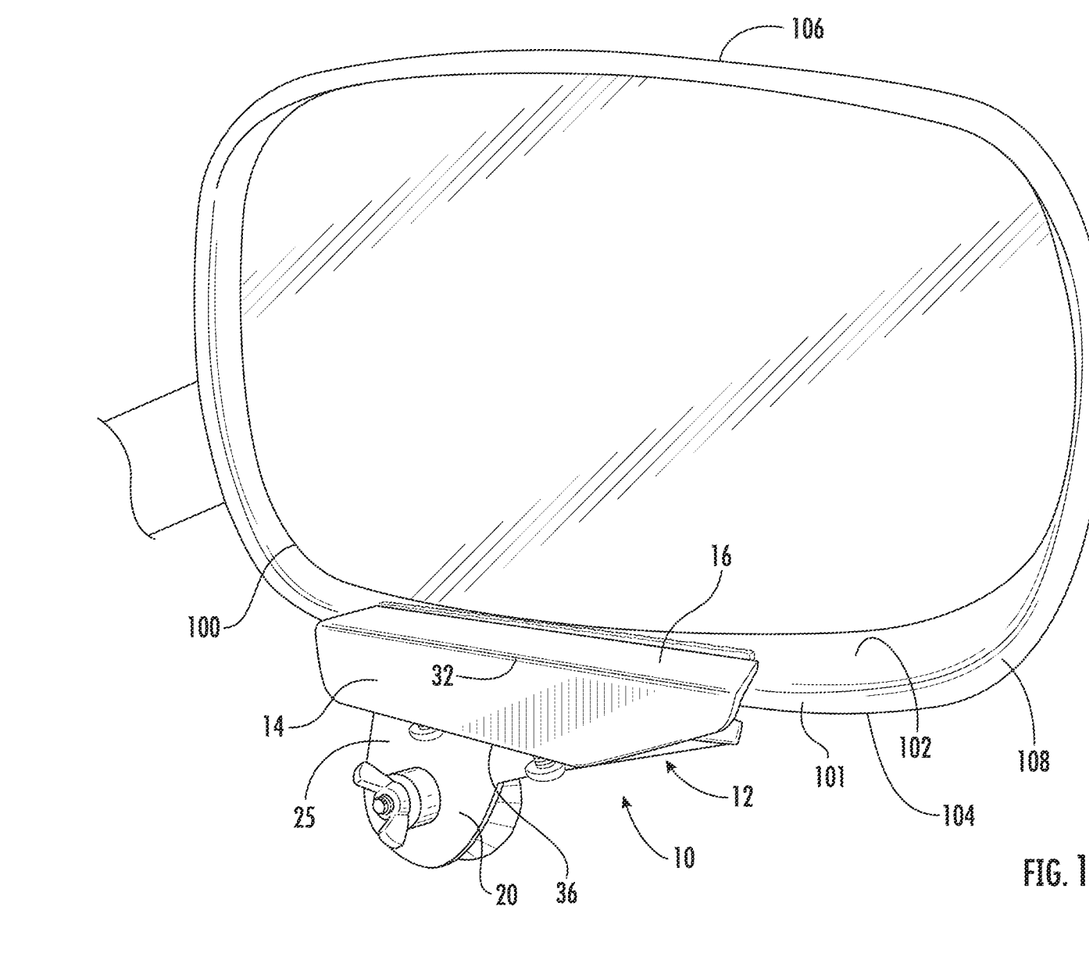
FIG. 1 is a perspective view of a vehicle display assemblage mountable about a side view mirror of a vehicle in accordance with the features of one embodiment of the present disclosure.

Referring now to the figures in which like reference designators refer to like elements. FIG. 1 shows an exemplary vehicle display assemblage constructed in accordance with the principles of the present disclosure and designated generally as vehicle display assemblage 10.

In particular, the vehicle display assemblage 10 comprises a clamping bracket 12. The clamping bracket 12 is constructed and arranged to secure with a side view mirror 100 of a vehicle. The clamping bracket 12 includes a base portion 14. In one non-limiting embodiment, the base portion 14 is formed in a u-shape.

Figure 2:
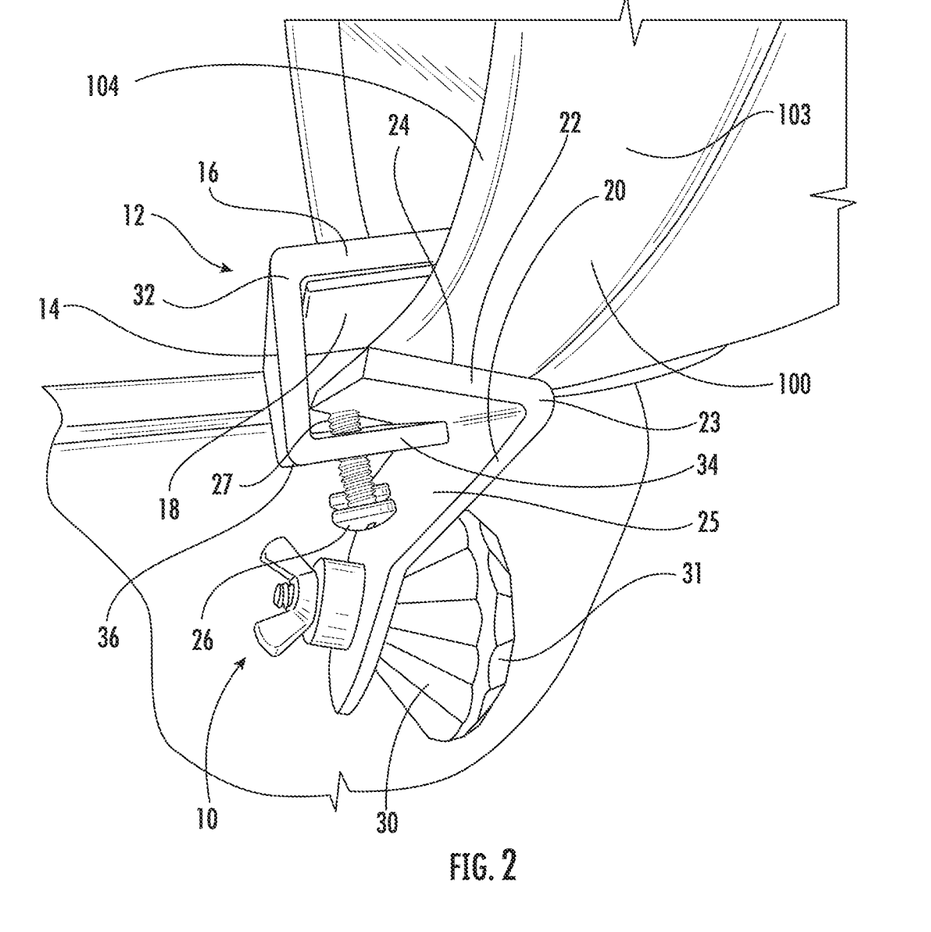
FIG. 2 is a side perspective view of the vehicle display assemblage in accordance with the principles of the present embodiment.

Referring now to FIGS. 1 and 2, the base portion 14 is provided having an upper clamp portion 16 that extends outward from a first edge 32 of the U-shaped base portion 14, the upper clamp portion 16 includes a downward facing clamp surface 18. The downward facing clamp surface 18 is constructed to affix against the inner surface 102 of the side view mirror 100. The U-shaped base portion 14 is further provided having a lower base 34 that extends outward from a second edge 36 of the U-shaped base portion 14.

Figure 3:
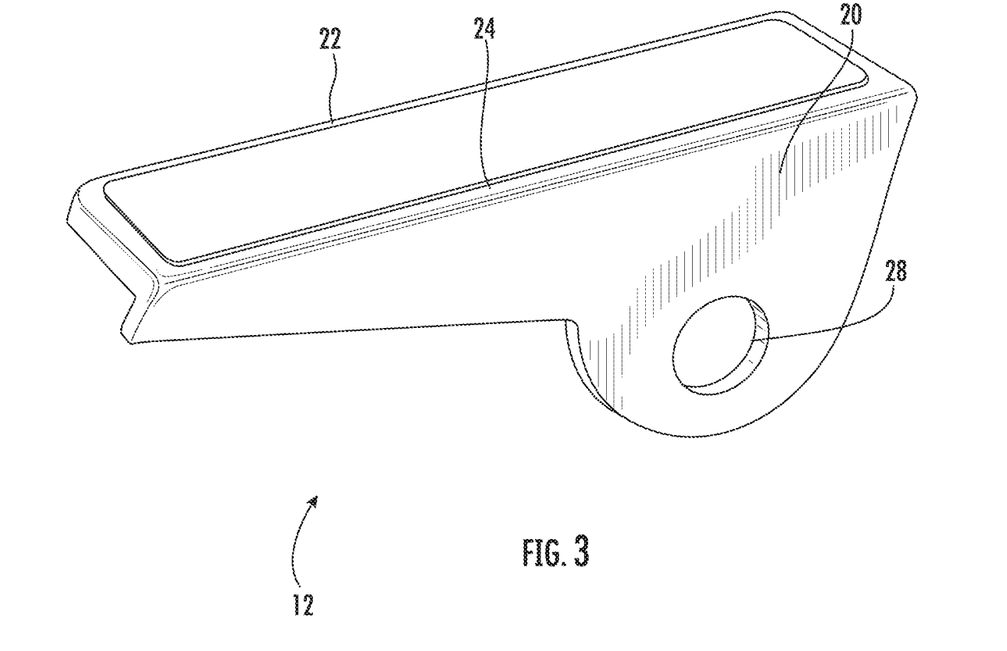
FIG. 3 is a perspective view of a clamp member of a vehicle display assemblage in isolation in accordance with the principles of the present embodiment.

Still referring to FIGS. 1 and 2, the clamping bracket 12 further includes a clamp member 20. The clamp member 20 is provided having a lower clamp portion 22 (FIGS. 2 and 3) that extends out from an edge 23 of a clamp base 25, the lower clamping portion 22 has an upward facing clamp surface 24 (FIG. 3). The upward facing clamp surface 24 is constructed to affix against the outer surface 103 of the side view mirror 100.

As illustrated in FIG. 2, the downward facing clamp surface 18 and the upward facing clamp surface 24 are positionable with opposing surfaces for sandwiching about a portion of the side view mirror 100.

Referring to FIG. 3, the clamping bracket 12 further includes one or more novelty display apertures 28 that extent outward from the clamping bracket 12. The one or more novelty display apertures 28 are constructed to accept one or more display members 30 (FIGS. 1 and 2). The one or more display members 30 (FIGS. 1 and 2) secure with the clamping bracket 12 about one or more apertures 28 for displaying substantially from the side view mirror 100 (FIG. 1).

Figure 4:
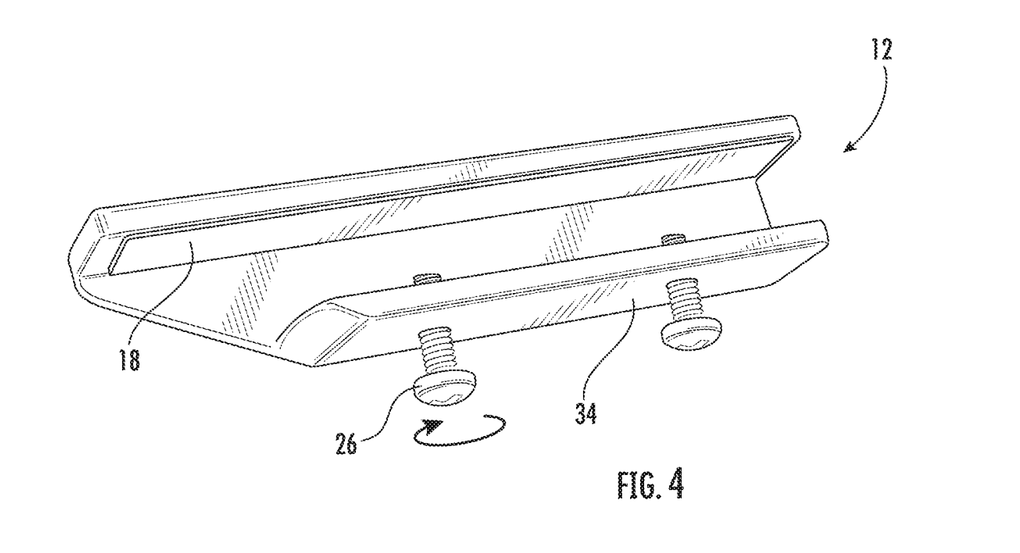
FIG. 4 is a rear perspective view of a clamping bracket of a vehicle display assemblage in isolation in accordance with the principles of the present embodiment.

Referring now to FIG. 4, the clamping bracket 12 includes the tightening members 26. The tightening members 26 shown in FIGS. 2 and 4 engage with the lower base 34. The tightening members 26 are rotatably provided for urging the upward facing clamp surface 24 (FIGS. 2 and 3) towards the downward facing clamp surface 18 (FIGS. 2 and 4) about distal end 27 (FIG. 2) of the tightening members 26.

In one non-limiting embodiment, the tightening members 26 are rotated about a threaded bore to exert a vertical force on the clamp member 20 to force the upward facing clamp surface 24 towards the downward facing clamp surface 18.

In one non-limiting embodiment, exemplified by the combination of FIGS. 1-4, the tightening members 26 are screws that are rotated in one direction thereby applying a force on the clamp member 20 which moves the clamp member 20 towards at least a portion of the base portion 14. In operation, the tightening of the tightening members 26 causes the downward facing clamp surface 18 and the upward facing clamp surface 24 to grip against the inner and outer surface 102 and 103 of the sideview mirror. The instant disclosure contemplates that the vehicle display assemblage 10 may be positioned along any portion of the sideview mirror edge 101, such that the vehicle display assemblage 10 is positioned along the bottom edge 104 of the side view mirror, as shown in FIGS. 1 and 2, or along the top edge 106 of the side view mirror, or anywhere in between.

In another non-limiting embodiment, the shape of the clamping bracket may be modified to allow the vehicle display assemblage 10 to be mounted about a substantially turning surface edge 108 (FIG. 1) of the side view mirror 100. In operation, this allows the display members 30 to be displayed about the side view mirror 100 at a combination of a vertical and/or horizontal distance out from the side view mirror. For example, FIGS. 1 and 2 exemplifies a display member 30 extending out below a side view mirror.

The downward facing clamp surface 18 and the upward facing clap surface 24 are in a clamping relation.

While the instant embodiment has depicted a novelty jewel 31 (FIG. 2), the one or more display members 30 may include any conceivable personalized novelty indicia. For example, a fisherman may optionally attach a fishhook or a fish lure. For another example, the display members 30 may include a personalized flag, such as a professional sports team.

For yet another example, the one or more display members 30 may include LED lights that illuminate. The LED lights may illuminate based on motion of the vehicle, such that the LED lights illuminate as the vehicle travels on roads. The LED lights may be powered via a battery and/or solar power. For example, if the one or more display members 30 are a gem (as illustrated), the gem itself will illuminate.

Figure 5:
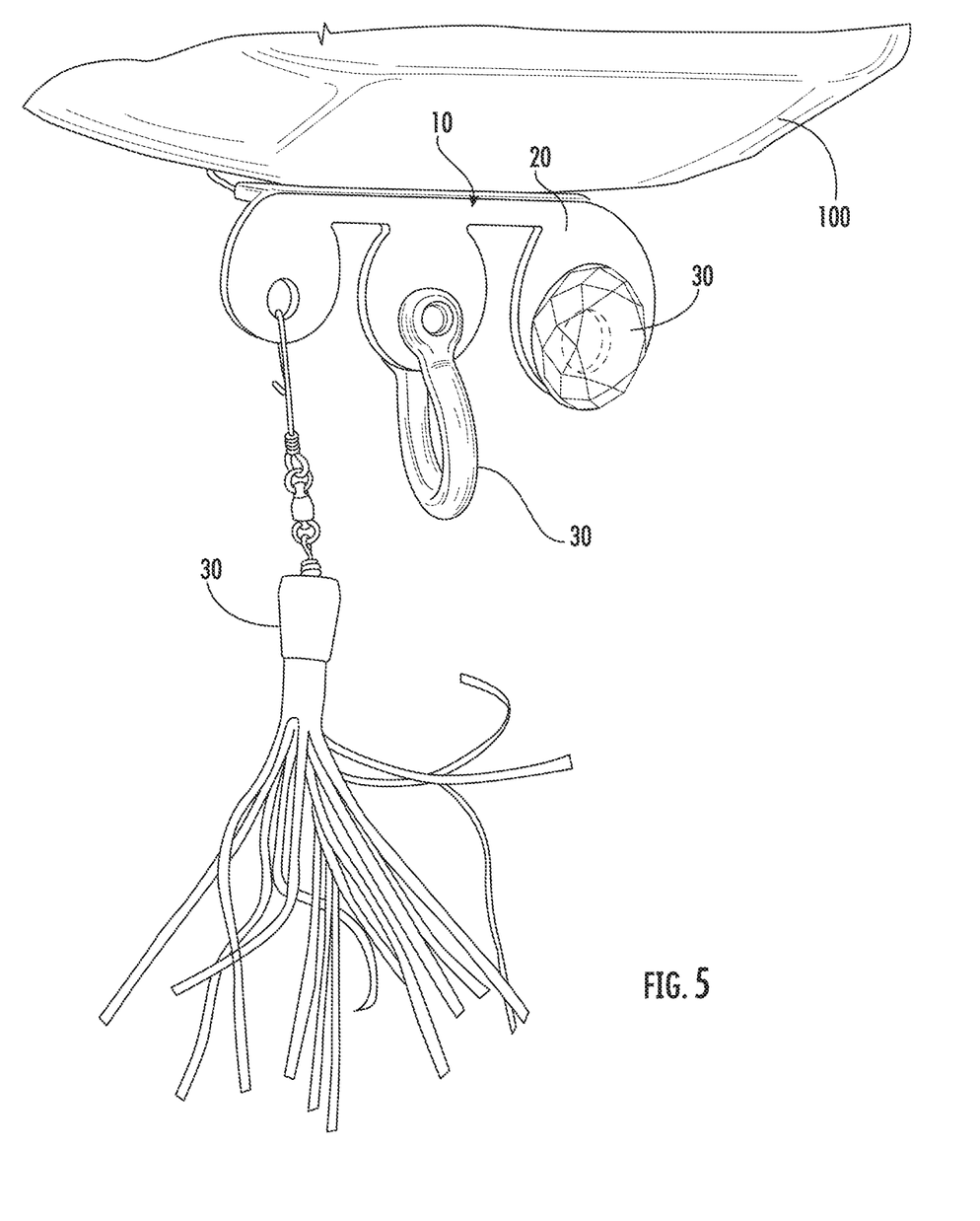
FIG. 5 is a front perspective view of an alternative embodiment of a vehicle display assemblage in accordance with the principles of the present embodiment.

FIG. 5 provides a front perspective view of the vehicle display assemblage 10 secured with a vehicle mirror 100 with a forward-facing display member 30 in relation to the vehicle sideview mirror 100. While the instant embodiment depicts multiple forward facing display member 30, display members may be alternatively displayed in additional orientations and directions, including to the side and behind as viewed relative to the vehicle sideview mirror 100. The instant embodiment provides exemplary display members 30, including a gem, jewelry, and a fishing lure.

Figure 6:
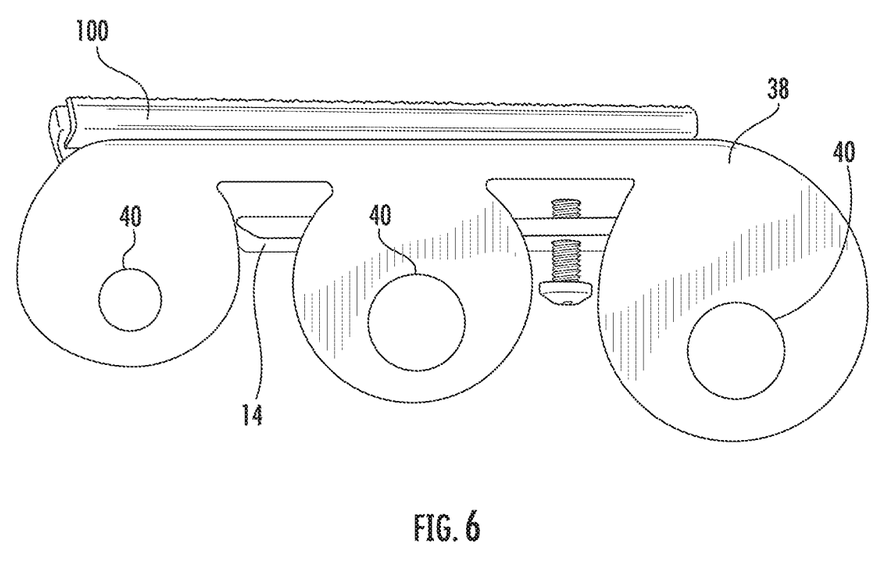
FIG. 6 is a front view of an alternative embodiment of the vehicle display assemblage in accordance with the principles of the present embodiment.

FIGS. 5 and 6 provide an alternative embodiment of clamp member 38 for securing with a side view mirror 100. An alternative example of the clamp member 38 is provided with multiple novelty display apertures 40 are constructed to accept multiple display members 30. The multiple display members 30 secure with the clamping bracket 12 for displaying multiple display members 30 substantially from the side view mirror 100. The clamp member 38 mates with the base portion 14, within the spirit and scope of the disclosure described herein.

Figure 7:
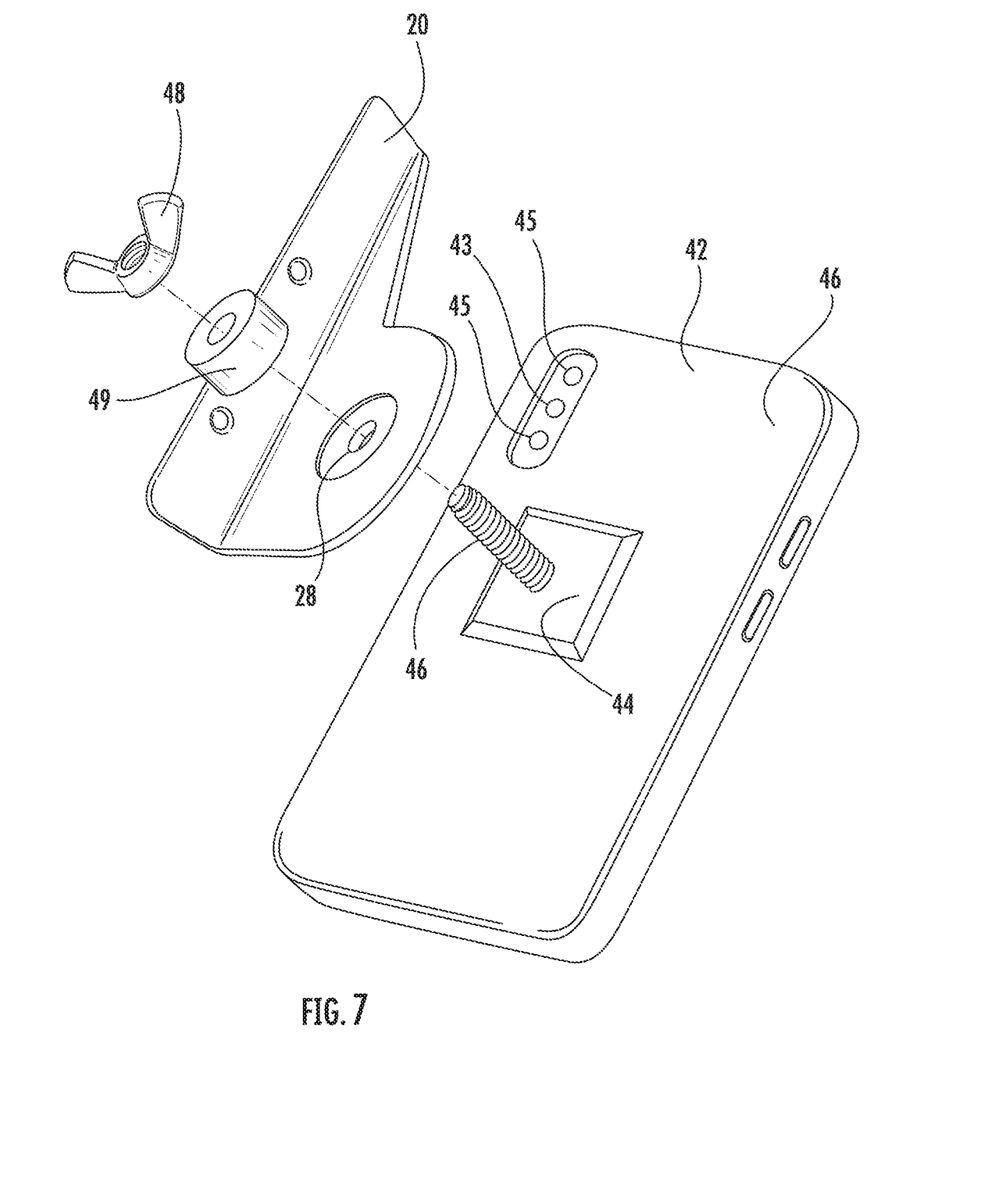
FIG. 7 is a side perspective view of an alternative embodiment of the vehicle display assemblage that includes a camera bracket in accordance with the principles of the present embodiment.

FIG. 7 provides a particular embodiment of a camera bracket 42 constructed and arranged to removably affix with the clamp member 20. The camera bracket includes a raised portion 44 situated on the rear body 46 of the camera bracket 42. The camera bracket 42 further includes a stem 46. The stem 46 is constructed to pass through the aperture 28 and secure with the clamp member 20. The stem 46 may optionally be threaded and secure with the clamp member 20 via a fastener 48, such as the wing nut, and washer 49, pictured in FIG. 7.

In one embodiment, the camera bracket 42 shown in FIG. 7 is shaped to retain a smart phone that has at least one camera 45. In a certain embodiment, the camera bracket 42 is a unitary plastic member.

Still referring to FIG. 7, the camera maintained by the camera bracket 42 may take pictures and/or video. In addition, the camera 43 maintained by the camera bracket 42 may take any combination of forward looking, side looking, and rear looking pictures and video. The camera subject may be illuminated by one or more lights 45.

While the instant disclosure provides a clamping mechanism that includes tightening members 26, namely screws, disposed about the U-shaped base portion that exert a force at a distal portion 27 of the tightening members 26 on the clamp member 20, the instant disclosure is not limited to screws. It is within the spirit and scope of the disclosure to include any means of securing the vehicle display assemblage with the side view mirror of a vehicle. Such means of securing the vehicle display assemblage with the side view mirror of the vehicle includes a suction member provided about the vehicle display assemblage for affixing with the side view mirror 100 via suction. In yet another alternative means of securing the vehicle display assemblage with the side view mirror of the vehicle includes a clamp with a mechanical lever for clamping with side view mirror 100.

While the instant disclosure provides a base portion 14 and a clamp member 20 that may be disjoined when not clamped with a vehicle side view mirror 100, it is within the spirit and scope of the instant disclosure to provide a base portion 14 and a clamp member 20 that are permanently coupled to one another.

Figure 8:
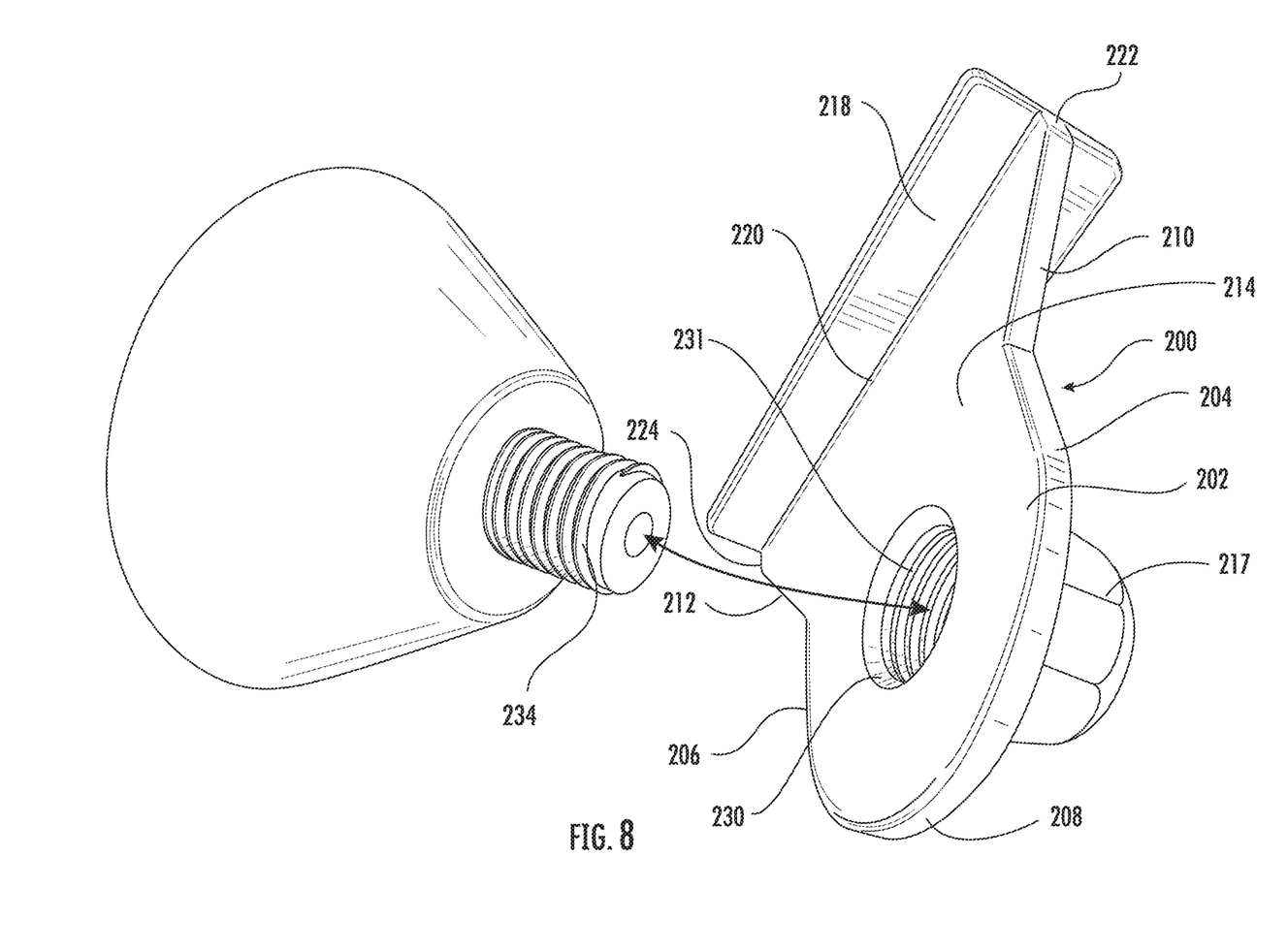
FIG. 8 is a front perspective view of an alternative embodiment of the vehicle display assemblage with an associated display member in accordance with the principles of the present embodiment.
Figure 9:
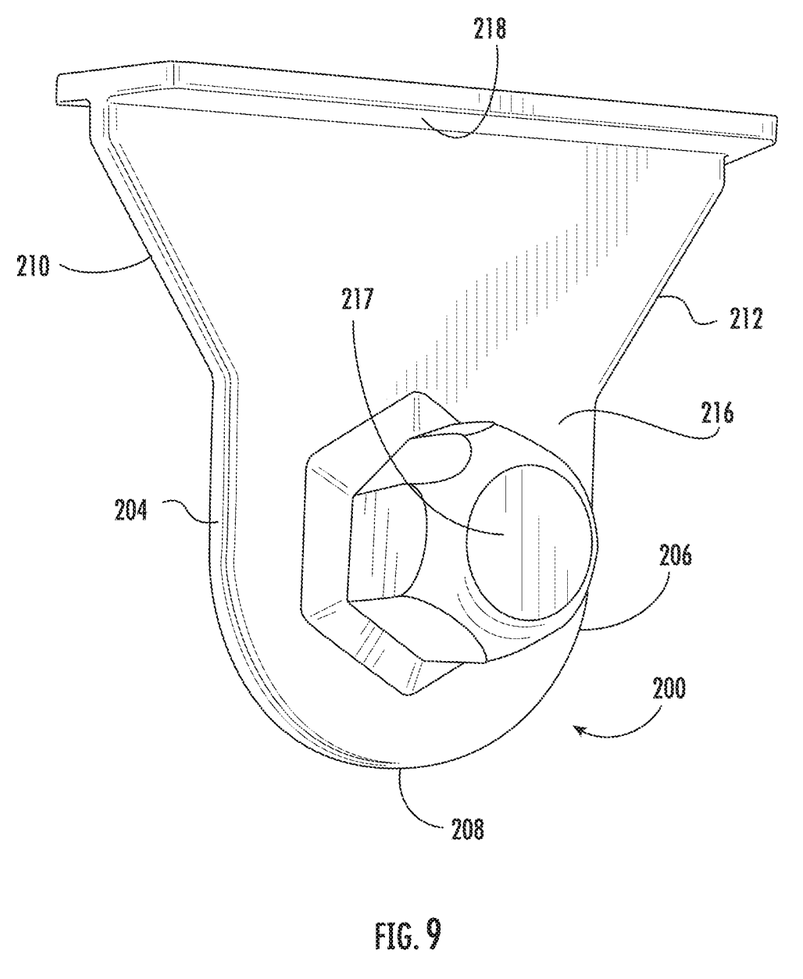
FIG. 9 is a rear perspective view of the vehicle display assemblage of FIG. 8 in accordance with the principles of the present embodiment.

Referring now to FIGS. 8 and 9, a vehicle display assemblage 200 attachable to a side view mirror of a vehicle with double sided tape for displaying at least one indicia member is shown. The vehicle display assemblage 200 includes a display body 202. The display body 202 is formed of substantially polyvinylchloride (PVC) material, or another suitable plastic, or other suitable material that is injection moldable into a one-piece injection molded body. The display body 202 includes a front-body portion 214 and a back-body portion 216. The display body 202 further includes a mount body 218 for mounting about a side-view mirror of a vehicle, the mount body 218 extending along the mount body edge 220 of the display body 202 between the first top edge 222 and second top edge 224.

Still referring to FIGS. 8 and 9, the display body 202 includes a first side edge 204 and a second side edge 206. The first and second side edge 204, 206 merge along a rounded bottom edge 208. The first and second side edge 204, 206 each continue along a first and second flange edge 210, 212, respectively, terminating at the first and second top edges 222, 224.

Referring now to FIGS. 8 and 9, the mount body 218 is formed extending substantially perpendicular with the display body 202.

The front-body portion 214 includes a cavity 230 for receiving a display member 232, the cavity 230 includes threading 231 for receiving a reciprocating threaded member.

The display body 202 further includes a cavity body 217 protruding out from the back-body portion 216. The cavity body 217 housing at least a portion of the cavity 230 with threading 231.

Figure 10:
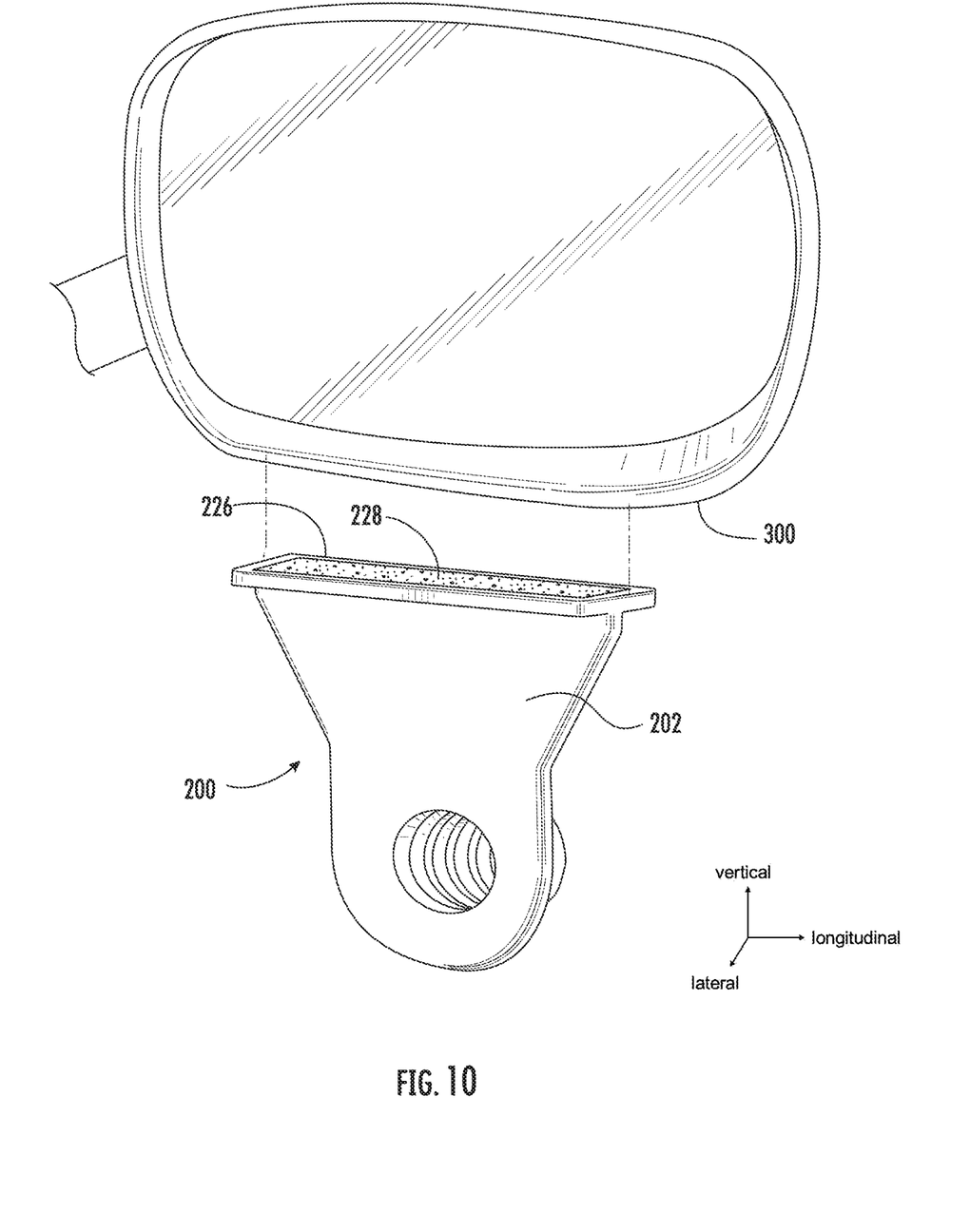
FIG. 10 is an upper perspective view of the vehicle display assemblage of FIG. 8 in accordance with the principles of the present embodiment.

Referring now to FIG. 10, the mount body 218 (shown in FIG. 9) includes an upward facing surface 226 formed to receive double sided tape 228. The double-sided tape 228 is securable on its one side with the upward facing surface 226 and securable on its opposite side to a portion of a side-view mirror 300 of a motor vehicle.

In one non-limiting embodiment, the display body 202 is secured along the upward facing surface 226 via double-sided tape to a bottom portion of the side-view mirror 300.

Referring now to FIGS. 8 and 11-13, one exemplary non-limiting display member 232 is shown that secures with the cavity 230 of the display body 202. The exemplary display member 232 is formed with a reciprocal threaded portion 234 constructed and arranged to rotatably secure with the threading 231 with the cavity 230. The exemplary display member 232 includes a conical surface 236 that terminates as a truncated cone surface 240 about the proximal end 238 reciprocal threaded portion 234.

Figure 11:
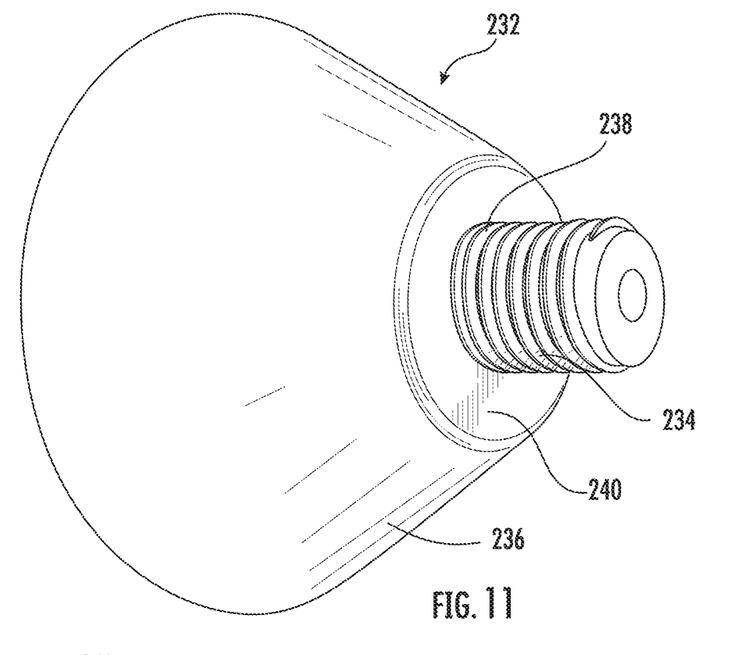
FIG. 11 is a rear perspective view of a display member in accordance with the principles of the present embodiment.
Figure 12:
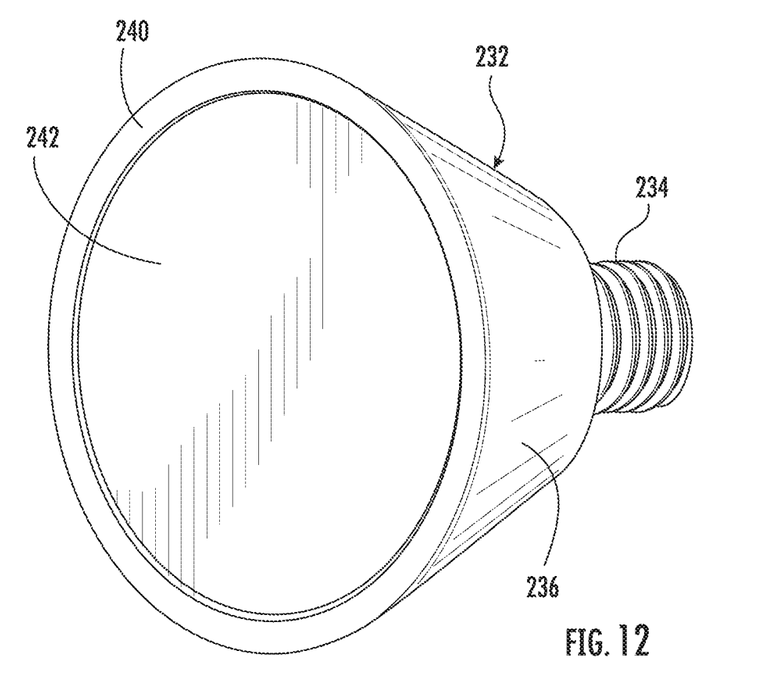
FIG. 12 is a front perspective view of a display member of FIG. 8 in accordance with the principles of the present embodiment.
Figure 13:
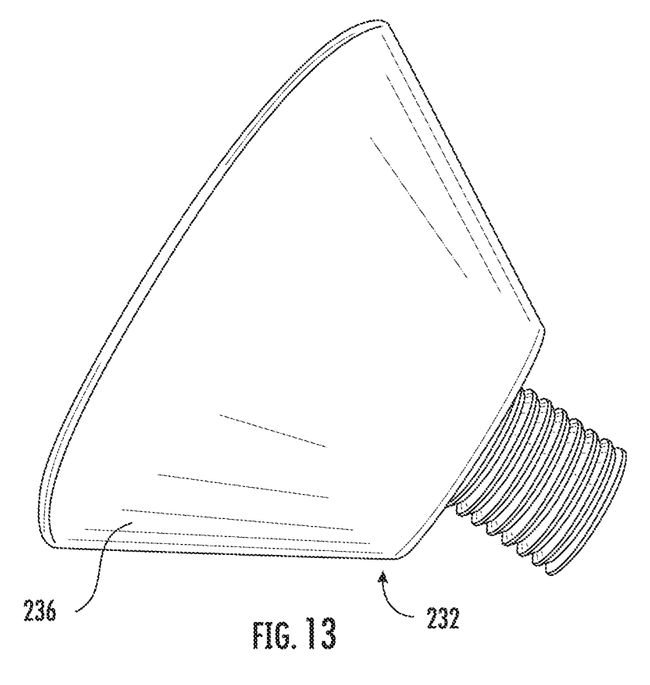
FIG. 13 is a side view of a display member of FIG. 8 in accordance with the principles of the present embodiment.

The display member 232 further includes an indicia surface 242 capable of receiving indicia for personalized display. Such indicia includes without limitation stickers, wherein the stickers may include graphics of sports teams, flowers, family/friend pictures or any other conceivable personalized indicia. It is within the spirit and scope of the present embodiment that the display body 202 can be optionally mounted with the side-view mirror 300 of a motor vehicle such that the front-body portion 214 is pointed forward using the motor vehicle as a reference, or alternatively the display body 220 can is mounted with the side-view mirror 300 of a motor vehicle such that the front-body portion 214 is pointed rear-ward using the motor vehicle as a reference.

Figure 14:
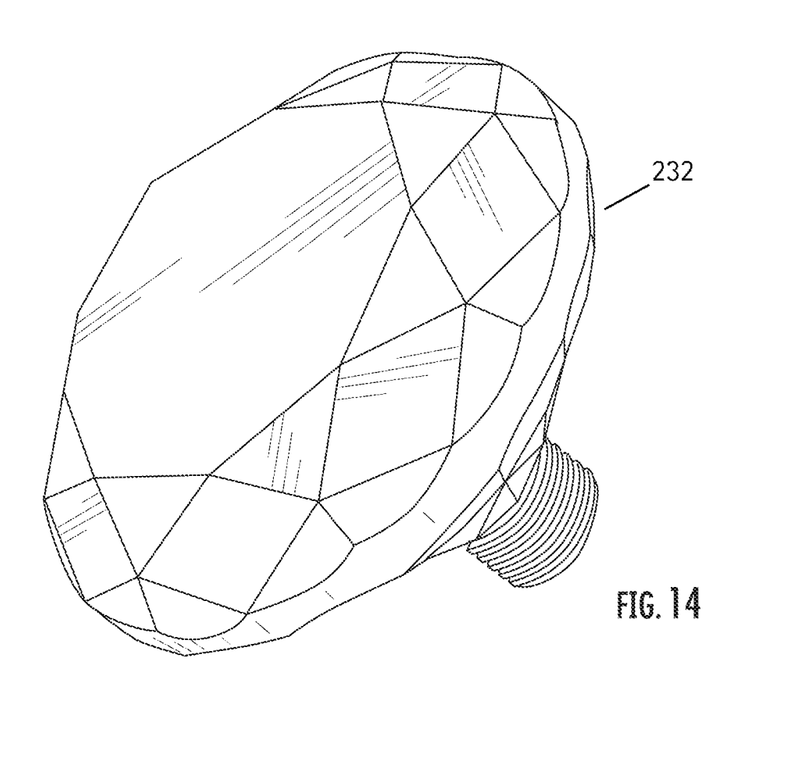
FIG. 14 is a front perspective view of an alternative display member shaped like jewelry for the vehicle display assemblage of FIG. 8 in accordance with the principles of the present embodiment.

Referring now to FIG. 14, an exemplary alternative non-limiting display member 232 is shown as a costume jewel member for rotatably mounting with the display body 202 for novelty and decorating a motor vehicle side-view mirror.

Figure 15:
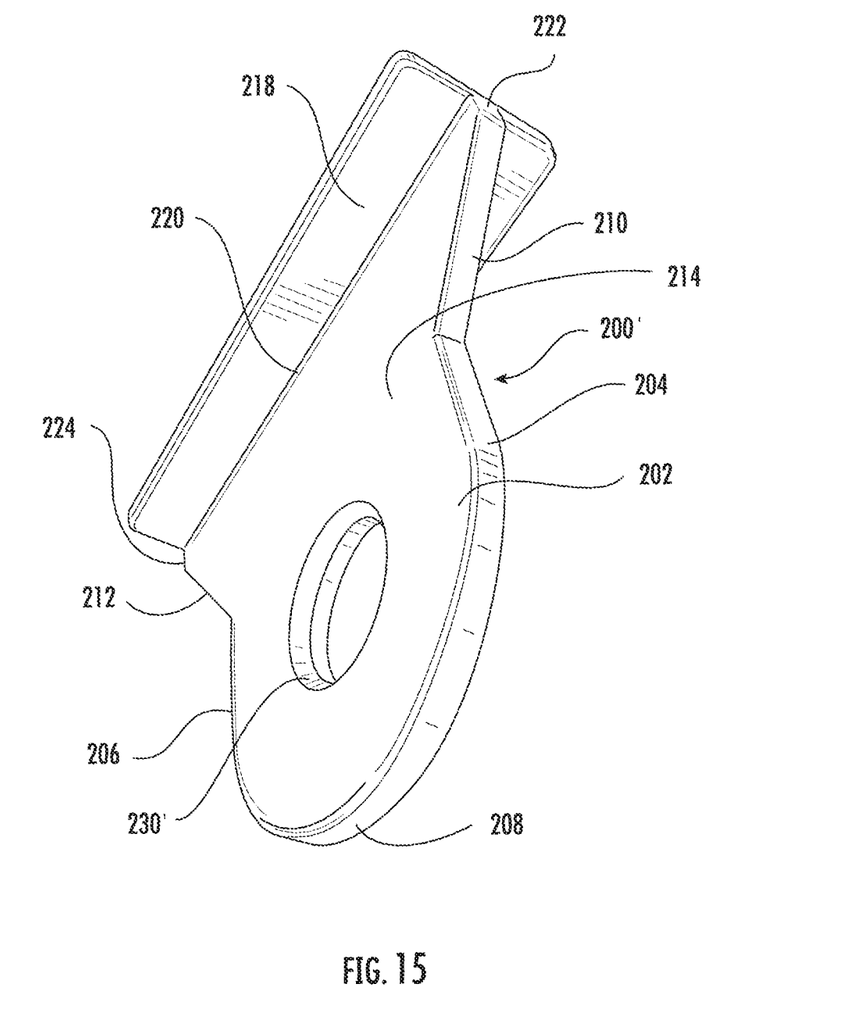
FIG. 15 is an alternative vehicle display assemblage having an aperture in the body for connecting alternative display indicia with an associated display member in accordance with the principles of the present embodiment.

Referring now to FIG. 15, an alternative vehicle display assemblage 200' is shown having a display body 202 that includes a front-body portion 214 and a back-body portion 216. The display body 202 further includes a mount body 218 for mounting about a side-view mirror of a vehicle, the mount body 218 extending along the mount body edge 220 of the display body 202 between the first top edge 222 and second top edges 224. The display body 202 includes a first side edge 204 and a second side edge 206. The first and second side edge 204, 206 merge along a rounded bottom edge 208. The first and second side edge 204, 206 each continue along a first and second flange edge 210, 212, respectively, terminating at the first and second top edges 222, 224. The mount body 218 is formed extending substantially perpendicular with the display body 202. The front-body portion 214 includes an alternative cavity 230'. In this embodiment, the cavity 230' in this embodiment (unlike the embodiment in FIG. 8) does not include threading but instead includes a display aperture (similar to element 40 herein). Numerous display indicia can be displayed from the cavity 230' within the spirit and scope of this disclosure.

Figure 16:
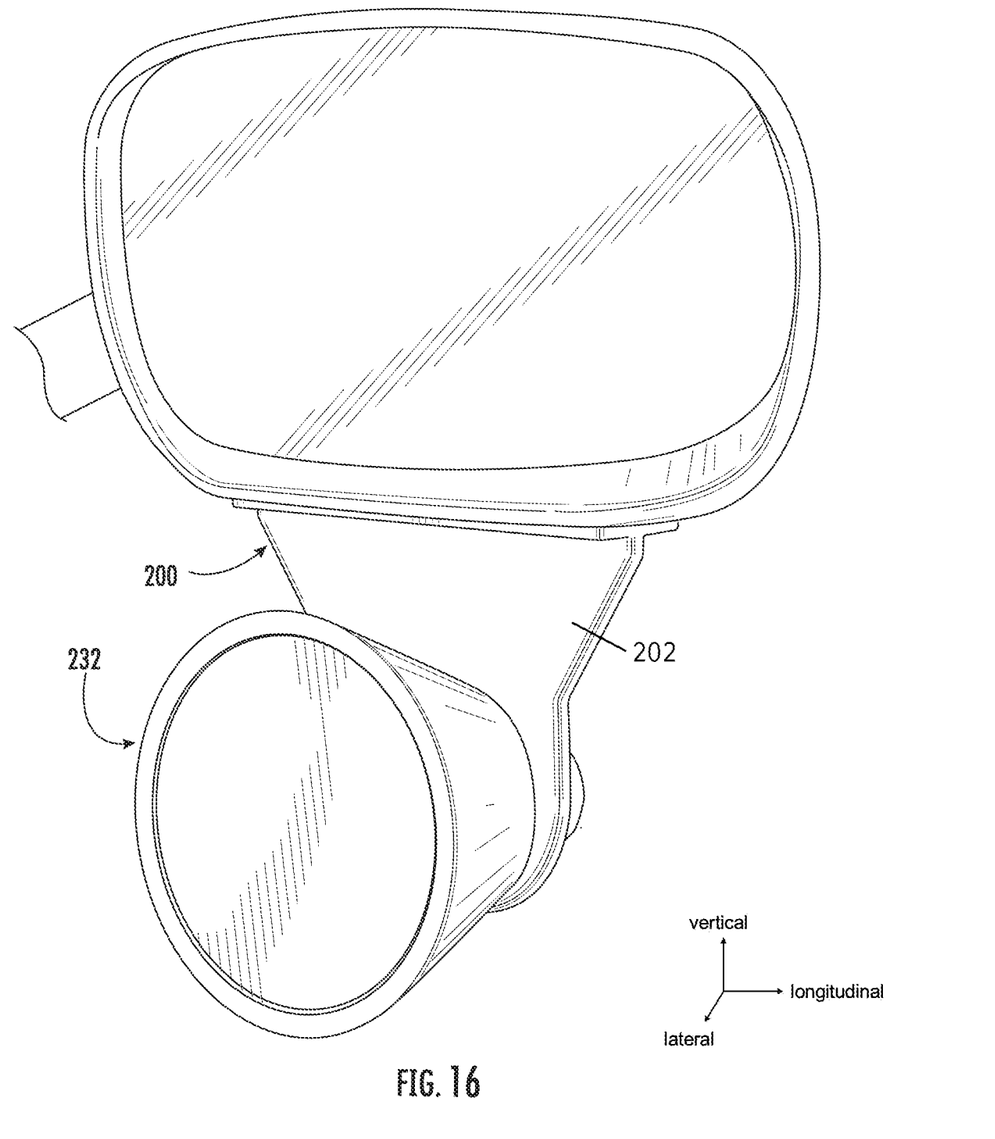
FIG. 16 is a front perspective view of an alternative embodiment of the vehicle display assemblage with an associated display member secured therewith of FIG. 8 in accordance with the principles of the present embodiment.

Referring now to FIG. 16, the vehicle display assemblage 200 display body 202 secured with a sideview mirror of FIG. 8 is shown, further with the display member 232 rotatably secured with the display assemblage 200 for displaying indicia about a sideview mirror of a vehicle.

In some embodiments, the novelty side-view mirror display assembly comprises a display body 200' constructed and arranged to secure via double-sided tape 228 against at least a portion of a side-view mirror of a motor vehicle for displaying indicia. In some embodiments, the display body 200' generally comprises a T-shaped cross-sectional shape, an upper portion 218, and a lower portion 202. In some embodiments, the upper portion 218 has an elongate structure with an upward facing surface 226 and a downward facing surface, the upward facing surface being configured for securing to the at least a portion of a side-view mirror. In some embodiments, the lower portion 202 protrudes outward from the bottom facing surface 220 of the upper portion, the lower portion 202 comprising a through hole 230' defining a spaced distance between a first face 214 and a second face 216. In some embodiments, the novelty sideview mirror display assembly further comprises double sided tape 228 affixed on a first side with said display and affixable on a second side with the side-view mirror of a motor vehicle. In some embodiments, the display body 200' is constructed and arranged to receive a display member 232 comprising a member 234 protruding from a surface thereof.

In some embodiments, the novelty display assembly comprises a display body 200' generally having a T-shaped cross-sectional shape. In some embodiments, the display body 200' includes an upper portion 218 and a lower portion 202. In some embodiments, the upper portion 218 has an elongate structure with an upward facing surface 226 and a downward facing surface 220. In some embodiments, the upward facing surface 226 is configured for mounting to an object. In some embodiments, the lower portion 202 protrudes outward from the bottom facing surface 220 of the upper portion. In some embodiments, the lower portion 202 comprising a first face 214, a second face 216 opposite the first face, and a threaded cavity 230/231 having an open end on the first face 214 and a closed end at the end of a cylindrical socket 217 protruding from the second face 216. In some embodiments, the display member 234 comprises a reciprocal threaded member 234 on a first end configured to be inserted into the open end of cavity 230 on the first face 214 and rotatably secured to the threaded cavity 231, and a second end opposite the first end having a surface 242 configured to display indicia.

In some embodiments, the display member has a truncated conical shape, wherein the first end comprises the reciprocal threaded member 234 protruding from a base of the truncated conically-shaped display member 232. In some embodiments, the upward facing surface 226 of the upper portion 218 is substantially covered with double-sided tape 228. In some embodiments, the upward facing surface 226 of the upper portion 218 comprises double-sided tape 218 for mounting to the object. In some embodiments, the upward facing surface 226 of the upper portion 218 is securable to a bottom surface of a side-view mirror of a motor vehicle. In some embodiments, the display member is a jewel display member.

As used herein, when the term "and/or" is used, it shall include all combinations of one or more of the associated described items.

As used herein, spatially relative terms may be intended to encompass the orientation of the different orientations of the system or device as it relates to the orientations depicted in the Figures. Such terms may include "inner", "outer", "above", "upper", "beneath", "below", "lower", and the like.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are contemplated in light of the above teachings without departing from the scope and spirit of the disclosure. It will be readily apparent that various changes may be made thereto without departing from the spirit and scope of the disclosure or sacrificing all of its material advantages. The examples and embodiments described herein are merely exemplary of the instant disclosure.

The invention claimed is:

1. A novelty display assembly for displaying indicia, comprising:
   a display body comprising an upper portion and a lower portion;
   wherein the upper portion has an elongate structure with an upward facing surface and a downward facing surface, the elongate structure defined by a longitudinal axis and a lateral axis, the upward facing surface being configured for mounting to an object;
   wherein the lower portion protrudes outward from the downward facing surface of the upper portion via a vertical axis, the lower portion comprising a first face, a second face opposite the first face, and a cavity having an open end on the first face and a closed end defined by a threaded cavity body protruding from the second face about the lateral axis; and
   a removable display member comprising a truncated conical shape with a reciprocal threaded member on a first end configured to be inserted into the open end of the cavity on the first face and rotatably secured to the threaded cavity body, the reciprocal threaded member protruding from a base of the truncated conically-shaped display member, and a second end opposite the first end having a surface configured to display the indicia.

2. The novelty display assembly of claim 1, wherein the upward facing surface of the upper portion is substantially covered with double-sided tape.

3. The novelty display assembly of claim 1, wherein the upward facing surface of the upper portion comprises double-sided tape for mounting to the object.

4. The novelty display assembly of claim 3, wherein the upward facing surface of the upper portion is securable to a bottom surface of a side-view mirror of a motor vehicle.

5. The novelty display assembly of claim 2, wherein the display member is a jewel display member.

6. The novelty display assembly of claim 4, wherein the surface configured to display the indicia surface faces forward or rearward with respect to a longitudinal axis of the motor vehicle.

7. The novelty display assembly of claim 2, wherein the display member further comprises a light source that illuminates.

8. The novelty display assembly of claim 2, wherein the indicia is capable of personalized customization.

9. A novelty display assembly for displaying indicia, comprising:
   a display body comprising an upper portion and a lower portion;
   wherein the upper portion has an elongate structure with an upward facing surface and a downward facing surface, the elongate structure defined by a longitudinal axis and a lateral axis, the upward facing surface being configured for mounting to a bottom surface of a side-view mirror of a motor vehicle, wherein the longitudinal axis of the upper portion is configured to be mounted about a longitudinal axis of the side-view mirror;
   wherein the lower portion protrudes outward from the downward facing surface of the upper portion via a vertical axis, the lower portion comprising a first face, a second face opposite the first face, and a cavity having an open end on the first face and a closed end defined by a threaded cavity body protruding from the second face about the lateral axis; and
   a removable display member comprising a reciprocal threaded member on a first end configured to be inserted into the open end of the cavity on the first face and rotatably secured to the threaded cavity body, and a second end opposite the first end having a surface configured to display the indicia;
   wherein the display member has a truncated conical shape, wherein the first end comprises the reciprocal threaded member protruding from a base of the truncated conically-shaped display member.

10. The novelty display assembly of claim 9, wherein the upward facing surface of the upper portion is substantially covered with double-sided tape.

11. The novelty display assembly of claim 9, wherein the upward facing surface of the upper portion comprises double-sided tape for mounting to the object.

12. The novelty display assembly of claim 9, wherein the surface configured to display the indicia surface faces forward or rearward with respect to the lateral axis.

13. The novelty display assembly of claim 9, wherein the indicia is capable of personalized customization.

* * * * *